(12) United States Patent
Kumar et al.

(10) Patent No.: US 11,532,917 B2
(45) Date of Patent: Dec. 20, 2022

(54) ELECTRICAL CONNECTOR, CONNECTOR ASSEMBLY AND CHARGING ROBOT FOR A CONDUCTIVE CHARGING SYSTEM

(71) Applicant: TE Connectivity Germany GmbH, Bensheim (DE)

(72) Inventors: Rajesh Kumar, Bensheim (DE); Maik Schaefer, Bensheim (DE); Uwe Hauck, Bensheim (DE); Helge Schmidt, Bensheim (DE); Waldemar Stabroth, Bensheim (DE); Markus Eckel, Bensheim (DE); Frank Ostendorf, Bensheim (DE); Alexander Jakob, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 38 days.

(21) Appl. No.: 17/123,323

(22) Filed: Dec. 16, 2020

(65) Prior Publication Data
US 2021/0194193 A1  Jun. 24, 2021

(30) Foreign Application Priority Data

Dec. 20, 2019  (EP) .................................... 19219149

(51) Int. Cl.
| | | |
|---|---|---|
| *H01R 24/86* | (2011.01) | |
| *B60L 53/35* | (2019.01) | |
| *B60L 53/16* | (2019.01) | |
| *H01R 13/24* | (2006.01) | |
| *H01R 13/62* | (2006.01) | |

(Continued)

(52) U.S. Cl.
CPC .............. *H01R 24/86* (2013.01); *B60L 53/16* (2019.02); *B60L 53/35* (2019.02); *H01R 13/2471* (2013.01); *H01R 13/6205* (2013.01); *H02J 7/0045* (2013.01); *H01R 2107/00* (2013.01); *H01R 2201/26* (2013.01)

(58) Field of Classification Search
CPC ..... H01R 24/86; H01R 13/2471; B60L 53/35; B60L 53/16
USPC .......................................................... 439/39
See application file for complete search history.

(56) References Cited

U.S. PATENT DOCUMENTS

| | | | |
|---|---|---|---|
| 5,821,731 A | 10/1998 | Kuki et al. | |
| 9,203,184 B1* | 12/2015 | Hui | ...................... H01R 13/629 |
| 9,496,638 B1* | 11/2016 | Su | ........................... H01R 24/58 |

(Continued)

FOREIGN PATENT DOCUMENTS

| | | |
|---|---|---|
| CN | 101567578 A | 10/2009 |
| DE | 10 2017 115 909 A1 | 1/2019 |
| EP | 3552858 A1 | 10/2019 |

OTHER PUBLICATIONS

English translation of CN 101567578A, dated Oct. 28, 2009, 3 pages.

(Continued)

*Primary Examiner* — Alexander Gilman
(74) *Attorney, Agent, or Firm* — Barley Snyder

(57) ABSTRACT

An electrical connector configured to be mated with a mating connector along a mating direction includes a plurality of contact elements each having a contact surface at least partially inclined with respect to the mating direction. The contact elements are spaced apart from each other along a circumferential direction with respect to the mating direction.

16 Claims, 6 Drawing Sheets

(51) Int. Cl.
*H02J 7/00* (2006.01)
*H01R 107/00* (2006.01)

(56) References Cited

U.S. PATENT DOCUMENTS

| | | | | |
|---|---|---|---|---|
| 9,620,896 | B1* | 4/2017 | Dubbaka | H01R 13/631 |
| 9,685,742 | B2* | 6/2017 | Liu | H01R 13/713 |
| 10,052,962 | B2* | 8/2018 | Dunger | B60L 58/21 |
| 10,298,036 | B2* | 5/2019 | Choi | H02J 7/0036 |
| 10,340,644 | B1* | 7/2019 | Lee | H01R 24/86 |
| 10,361,512 | B2* | 7/2019 | Seido | H01R 13/64 |
| 10,431,944 | B1* | 10/2019 | Su | H01R 24/86 |
| 10,559,931 | B2* | 2/2020 | Reed | H01R 33/7635 |
| 10,811,821 | B2* | 10/2020 | Aoshima | H01R 13/642 |
| 11,034,254 | B2* | 6/2021 | Booth | H02J 7/0013 |
| 2012/0208403 | A1* | 8/2012 | Hino | H01R 13/4538 439/626 |
| 2014/0239890 | A1 | 8/2014 | Patwardhan | |
| 2015/0099391 | A1* | 4/2015 | Hashimoto | H01R 13/631 439/380 |
| 2015/0280343 | A1* | 10/2015 | Hsu | H01R 13/2421 29/884 |
| 2016/0172799 | A1* | 6/2016 | Endo | H01R 13/111 439/733.1 |
| 2017/0106762 | A1* | 4/2017 | Dow | B60L 53/36 |
| 2017/0179631 | A1* | 6/2017 | Feldchtein | H01R 13/64 |
| 2017/0253136 | A1 | 9/2017 | Lord et al. | |
| 2017/0279230 | A1* | 9/2017 | Komoto | H01R 24/86 |
| 2018/0183182 | A1* | 6/2018 | Fukumoto | H01R 13/6277 |
| 2020/0161815 | A1* | 5/2020 | Houir Alami | H01R 13/625 |
| 2021/0194193 | A1* | 6/2021 | Kumar | H01R 24/38 |

OTHER PUBLICATIONS

Abstract not available for DE 102017115909; Abstract of corresponding document WO2019011648, dated Jan. 17, 2019, 2 pages.
Extended European Search Report, dated May 29, 2020, 6 pages.

* cited by examiner

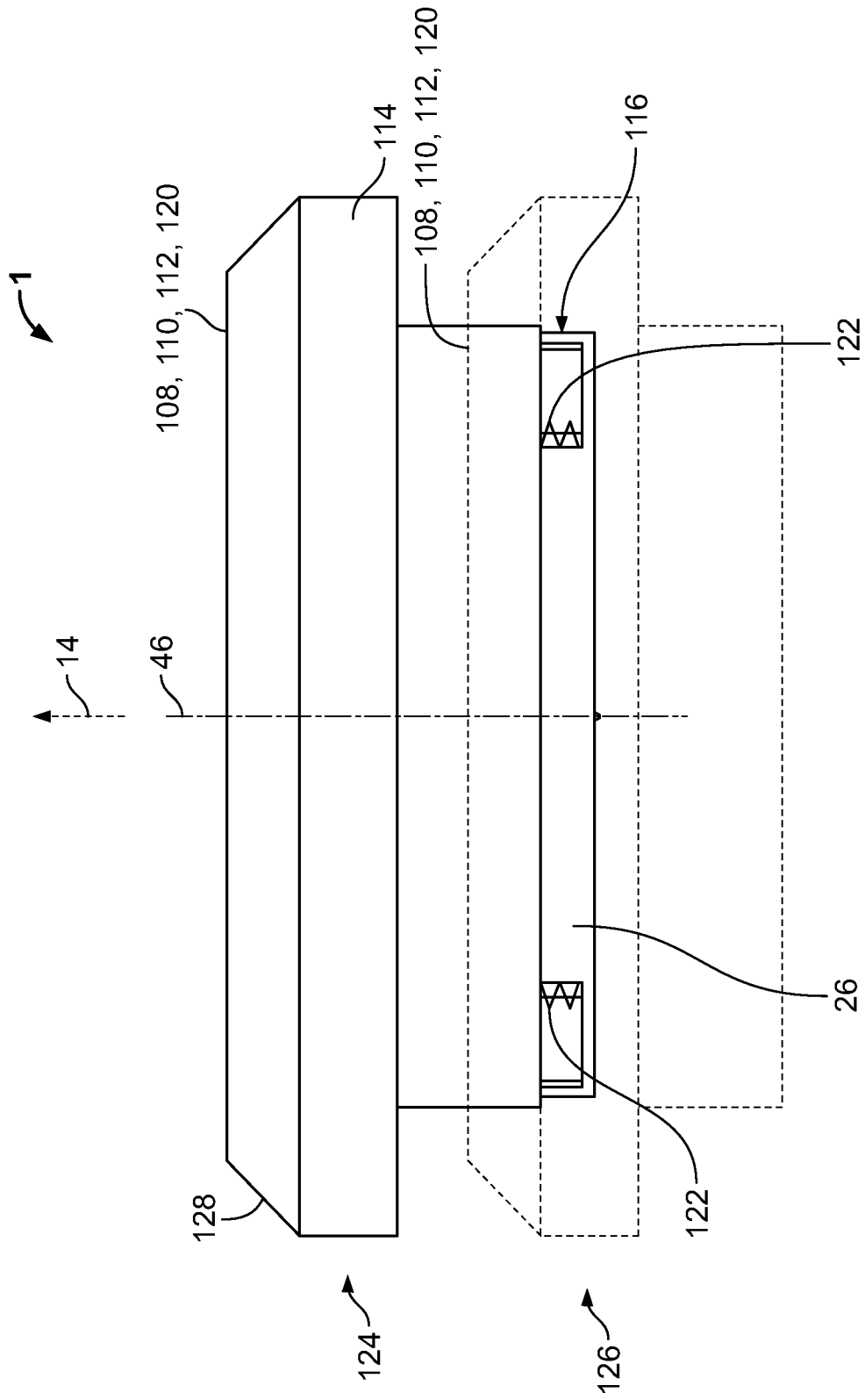

ELECTRICAL CONNECTOR, CONNECTOR ASSEMBLY AND CHARGING ROBOT FOR A CONDUCTIVE CHARGING SYSTEM

CROSS-REFERENCE TO RELATED APPLICATION

This application claims the benefit of the filing date under 35 U.S.C. § 119(a)-(d) of European Patent Application No. 19219149, filed on Dec. 20, 2019.

FIELD OF THE INVENTION

The present invention relates to an electrical connector and, more specifically, to an electrical connector for a charging system.

BACKGROUND

In the field of electromobility, charging systems for batteries are required to operate with a high efficiency, while maintaining their functionality throughout the entire service life. Charging systems operating according to the inductive principle (i.e. energy transmission through electromagnetic induction between a source-side module and a load-side module) often exhibit high energetic losses and take up comparably large space. This is especially disadvantageous for large-scale charging systems e.g. of electric vehicle batteries and the like.

Charging systems, in which energy transmission takes place through an electric current directly flowing between a source-side conductor and a load-side conductor (i.e. conductive charging systems), require sufficient contacting forces between the respective conductors in order to achieve efficient energy transmission. This contacting force is typically exerted by spring-like electrical contact elements, which constitute the respective conductors. As a result, high mating forces are necessary during the mating process. Furthermore, the conductors' contact surfaces slide and scrape each other during the mating process, thus creating the risk of wear and damage to the contact surfaces, which are usually plated with an electrically conductive layer for reducing the electric contact resistance between the conductors. Damage to the contact surfaces causes the electric contact resistance to increase and the efficiency of the charging system to drop.

SUMMARY

An electrical connector configured to be mated with a mating connector along a mating direction includes a plurality of contact elements each having a contact surface at least partially inclined with respect to the mating direction. The contact elements are spaced apart from each other along a circumferential direction with respect to the mating direction.

BRIEF DESCRIPTION OF THE DRAWINGS

The invention will now be described by way of example with reference to the accompanying Figures, of which:

FIG. 6 is a side view of an electrical connector according to another embodiment.

DETAILED DESCRIPTION OF THE EMBODIMENT(S)

Figure 1:
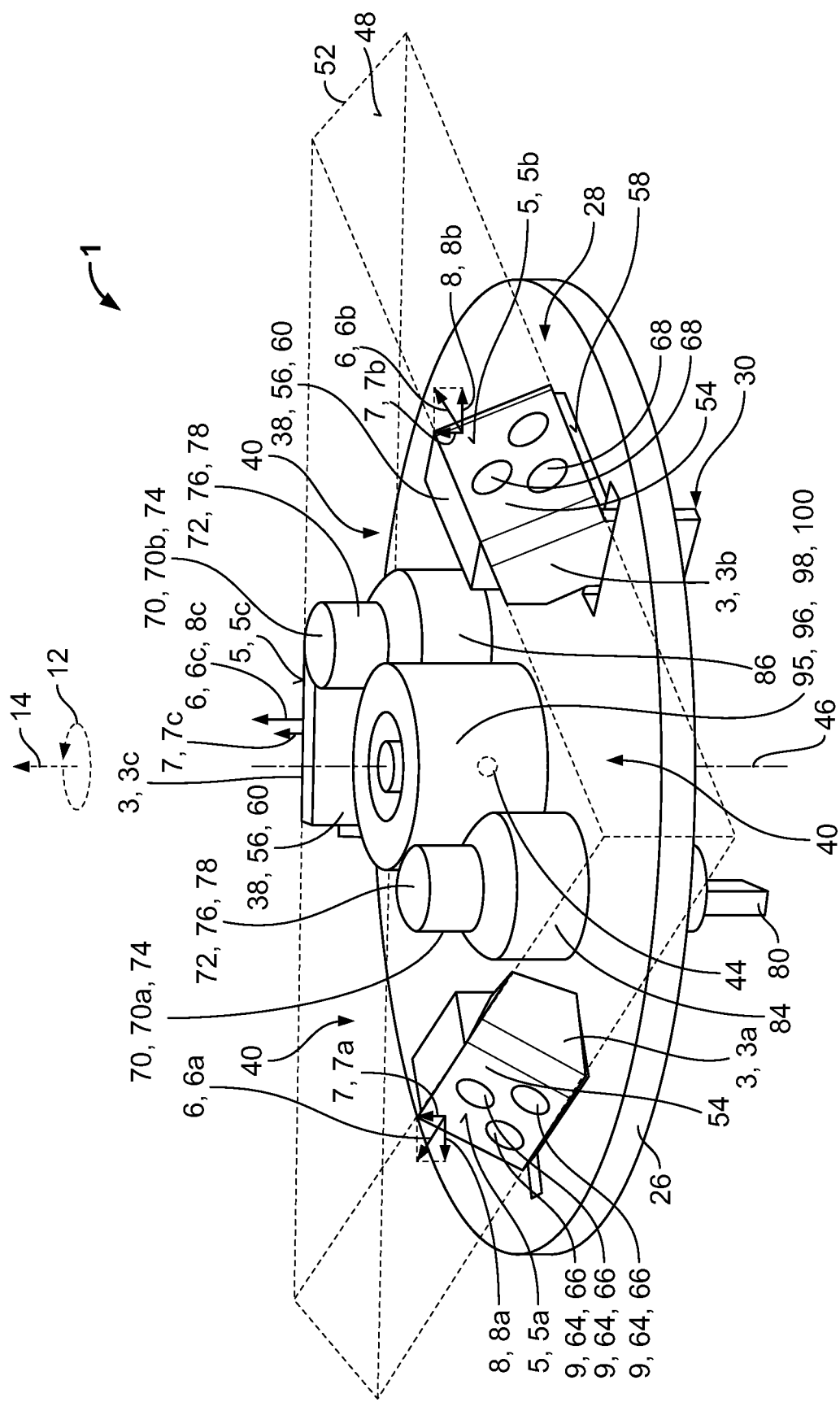
FIG. 1 is a perspective view of an electrical connector according to an embodiment.

In the following, exemplary embodiments of the invention are described with reference to the drawings. The shown and described embodiments are for explanatory purposes only. The combination of features shown in the embodiments may be changed according to the description. For example, a feature which is not shown in an embodiment but described may be added if the technical effect associated with this feature is beneficial for a particular application. Vice versa, a feature shown as part of an embodiment may be omitted if the technical effect associated with this feature is not needed in a particular application. In the drawings, elements that correspond to each other with respect to function and/or structure have been provided with the same reference numeral.

The structure of possible embodiments of an electrical connector 1 and a connector assembly 2 according to the present invention is explained with reference to the exemplary embodiments shown in FIGS. 1 to 6.

FIG. 1 shows a perspective view of the electrical connector 1 for a conductive charging system of an electric vehicle battery according to one exemplary embodiment of the present invention. The conductive charging system may be part of an electric vehicle battery, a traction battery or the like, with a transmission capacity of more than 15 kW, such as 22 kW.

The electrical connector 1 may be configured to be mated with a mating connector 10 (see FIG. 3) along a mating direction 14. For this, the electrical connector 1 may comprise at least two, identical and rigid in an embodiment, contact elements 3 each with an electrically conductive contact surface 5. According to the shown embodiment, the at least two contact elements 3 have a same height 16 and are positioned at a same level 18 (see FIG. 4) with respect to the mating direction 14.

As shown in FIG. 1, each contact surface 5 is at least partially inclined, in an embodiment oblique, with respect to the mating direction 14. It can be seen that each contact surface 5 has at least one surface normal vector 6, which contains a first vector component 7 pointing in the mating direction 14 and a second vector component 8 perpendicular to the mating direction 14.

The electrical connector 1 may comprise a base plate 26. In the exemplary embodiment of FIG. 1, a circular, disc-shaped base plate 26 is shown. Alternatively, the base plate 26 may also have one of a rectangular, oval and polygonal shape. The base-plate 26 may be made of an electrically insulating material, such as a resin, so as to function as electrical insulation between the at least two contact elements 3.

Figure 2:
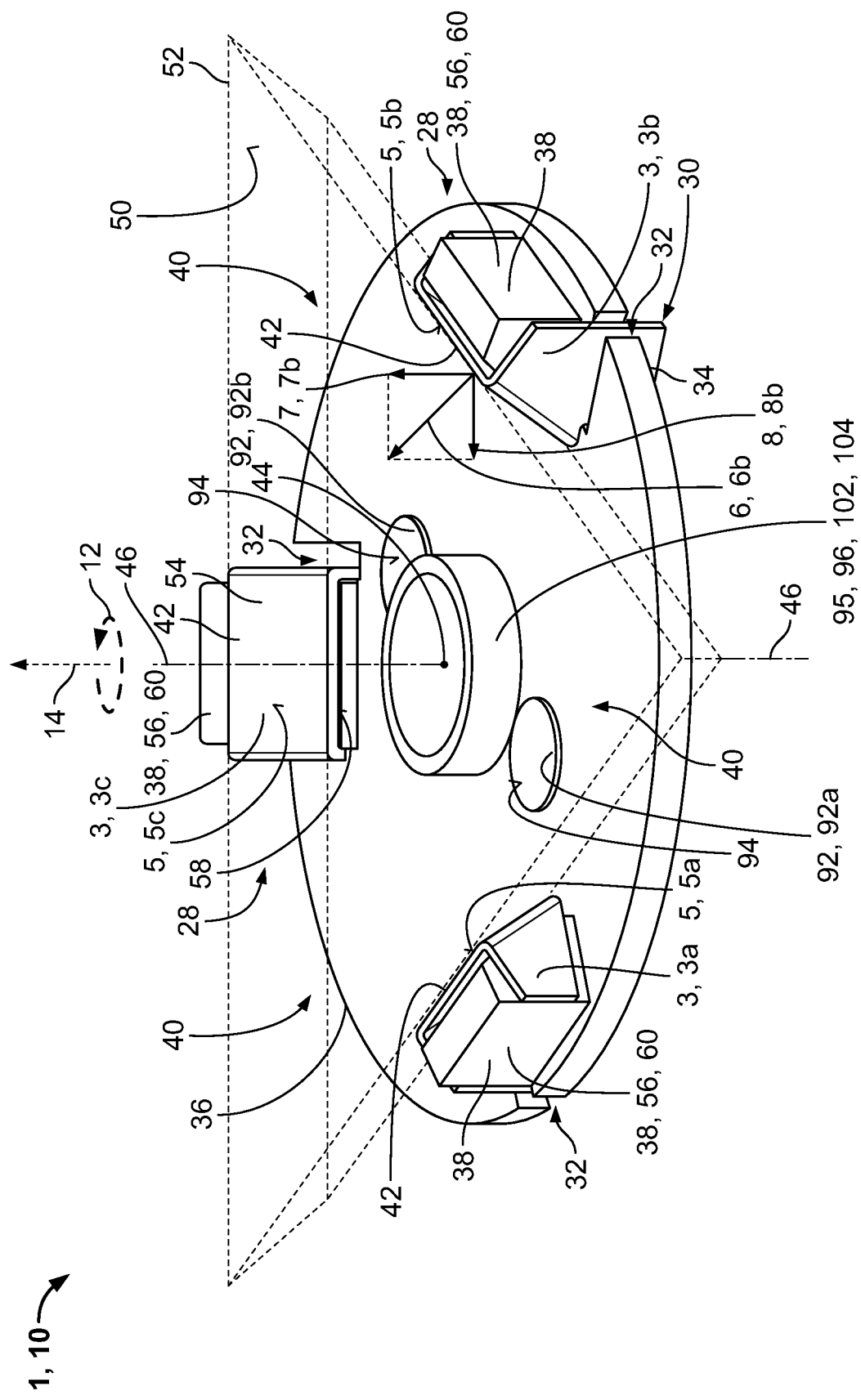
FIG. 2 is a perspective view of an electrical connector according to another embodiment.

As shown in FIGS. 1 and 2, the at least two contact elements 3 may extend along the mating direction 14 through the base plate 26, penetrate the base plate 26 and be rigidly held by the base plate 26. In particular, each contact element 3 has a contacting section 28 and a terminal section 30, the contacting section 28 comprising the contact surface 5 and protruding from the base plate 26 in the mating direction 14. The terminal section 30 may penetrate the base plate 26 against the mating direction 14 through a slit 32 extending from an outer edge 34 of the base plate 26 towards an opposite edge 36 of the base plate 26.

The base plate 26 has at least one socket 38, on which the at least two contact elements 3 are attached, as shown in FIGS. 1 and 2. In an embodiment, the at least two contact elements 3 are stiffly attached to the at least one socket 38, thereby being fixedly held in their respective inclined position.

In an embodiment, at least one of the at least two contact elements 3 may be attached to the base plate 26 via a joint, such as a knuckle joint, so as to be pivotable about a pivoting axis extending perpendicularly to the mating direction 14. This embodiment allows for misalignments between the contact surfaces 5 of the at least two contact elements 3 and the corresponding contact surfaces 11 of the mating connector 10 to be compensated within the range of motion of the joint, thus preventing wedging and bad contact.

The terminal section 30 may serve for connecting an internal cable or wires of the electrical connector 1 to the respective contact element 3, e.g. through clamping, welding, soldering, or comparable bonding methods. Additionally or alternatively, the terminal section 30 may serve for attaching the respective contact element 3 to the above-mentioned joint.

In the shown embodiments of FIGS. 1 and 2, the electrical connector 1 has three contact elements 3a, 3b, 3c, which are spaced apart from each other along a circumferential direction 12 with respect to the mating direction 14. In the embodiment, the three contact elements 3a, 3b, 3c are for conducting a three-phase electric current. The three contact elements 3a, 3b, 3c may be solitary, freestanding in an embodiment, and may, pairwise, form gaps 40. The at least two contact elements 3 may be a detached structure, freestanding, self-supporting and/or self-standing. If more than two contact elements 3 are comprised by the electrical connector 1, all contact elements 3 may form gaps 40 pairwise. With the help of said gaps 40, the necessary clearance distances and creepage distances may be maintained.

Further, the three contact elements 3a, 3b, 3c may provide three points of mechanical abutment 42 for corresponding contact elements 4, 4a, 4b, 4c (see FIG. 3) of the mating connector 10, which is advantageous for the electrical connector in terms of stability, as the three points of mechanical abutment precisely define a plane for a stable position (i.e. three-point stability).

In FIG. 1, the contact surfaces 5a, 5b, 5c of the three contact elements 3a, 3b, 3c face obliquely outwards with respect to a center 44 of the base plate 26, wherein the center 44 of the base plate 26 is the center of gravity of the base plate 26. The three contact elements 3a, 3b, 3c may further face away from a center axis 46 of the base plate 26, passing the center 44 of the base plate 26 and extending parallel to the mating direction 14. In sum, the contact surfaces 5a, 5b, 5c may each have at least one surface normal vector 6a, 6b, 6c, which contains a first vector component 7a, 7b, 7c pointing in the mating direction 14 and a second vector component 8a, 8b, 8c perpendicularly to the mating direction 14 and pointing away from the center 44 and/or the center axis 46.

By providing at least two contact elements 3a, 3b, 3c, which are separated from each other, the electrical connector 1 may be used for conducting an alternating current, such as an alternating current around 40 A such as between 10 A and 100 A. Furthermore, the at least two contact elements 3a, 3b, 3c with their inclined contact surfaces 5 may be configured to fulfill a self-centering function as will be described further below. The geometric arrangement of the contact surfaces 5 may be utilized to convert a relative movement between the electrical connector 1 and the mating connector 10 from a translational movement in the mating direction 14 into a translational movement perpendicular to the mating direction 14. This results in a translational movement directed towards the center axis 46. Thus, the alignment of the electrical connector 1 and the mating connector 10, and especially the alignment of the corresponding contact surfaces 5, 11 may be facilitated.

In particular, the contact surfaces 5a, 5b, 5c may be part of an outer surface 48 of a truncated triangular pyramid 52 tapering in the mating direction 14. For this, each contact surface 5a, 5b, 5c may comprise at least one flat portion 54 as shown in FIG. 1. Alternatively, each contact surface 5a, 5b, 5c may comprise at least one curved, arced in an embodiment, portion, which is part of a surface rotated around the center axis 46, such as a cone, a rotational paraboloid or a semi-sphere. Furthermore, the contact surfaces 5a, 5b, 5c may be distributed equigonally and equidistantly in a circular arrangement and may each extend along a segment of the base plate 26 in a circumferential direction 12 with respect to the center 44 and/or center axis 46.

It is to be understood that the electrical connector 1 may also comprise a plurality of more than three contact elements 3 depending on the necessary electrical energy transmission. In this case, the plurality of contact elements 3 may be arranged in a circular arrangement around the center 44 of the base plate 26 and with the same radius. Further, the contact surfaces 5 may be arranged as part of a surface of any kind of polyhedron widening or tapering in the mating direction 14, or, alternatively, as part of a surface of any kind of body rotated around the center axis 46 of the base plate 26 widening or tapering in the mating direction 14.

In the embodiment shown in FIG. 2, the contact surfaces 5a, 5b, 5c of the three contact elements 3a, 3b, 3c face obliquely inwards with respect to the center 44. Consequently, the contact surfaces 5a, 5b, 5c may be part of an inner surface 50 of a truncated triangular pyramid 52 widening in the mating direction 14.

Further, in the shown embodiments of FIGS. 1 and 2, each contact element 3a, 3b, 3c is positioned on a separate, solitary socket 38 protruding along the mating direction 14. This embodiment represents a material saving design of the electrical connector 1, resulting in less weight. More precisely, socket material is concentrated and limited only to where it is necessary for providing mechanical support to the respective contact element 3a, 3b, 3c.

Each socket 38 may protrude as a pedestal-like or pillar-like block from the base plate 26 along the mating direction 14. Each socket 38 may be monolithically formed by the base plate 26 as a pedestal-like block 56 with a mounting surface 58, wherein the mounting surface 58 is inclined with respect to the mating direction 14. The at least two contact elements 3 may be punched or stamped plate-like contact elements 3, which are bent around the respective socket 38.

The contact elements 3a, 3b, 3c may be plate-like contact elements 3, which are bent around the respective socket 38 and at least partially cover the mounting surface 58. In an embodiment, the contact elements 3a, 3b, 3c are bent in such a way that each contact surface 5a, 5b, 5c is parallel to the respective mounting surface 58. Thereby, the mounting surface 58 may provide mechanical support 60 for the respective contact element 3a, 3b, 3c to abut against and bear on.

Referring again to FIG. 1, each contact surface 5a, 5b, 5c may have at least one convex protrusion 9, such as a knob 64 or a dimple 66. In the shown embodiment of FIG. 1, each contact surface 5a, 5b, 5c has three convex protrusions 9. Depending on the necessary current carrying capacity, each contact surface 5a, 5b, 5c may also have a plurality of more than three convex protrusions 9. In an embodiment, all vertices 68 of the plurality of convex protrusions 9 are arranged on a surface of one of a common polyhedron and rotated body. The at least one convex protrusion 9 may be formed during the manufacturing of the contact element 3, e.g. by a pressing or forging process, and represents a means of defining the point of electrical contacting.

The electrical connector 1 may comprise at least one, in an embodiment spring-loaded, contact pin 70, as shown in FIG. 1, which is movable, e.g. retractable against the mating direction 14, and has an electrically conductive end section 72 facing in the mating direction 14. In an embodiment, the at least one contact pin 70 is a pogo pin 74, which has a tip 76 with a curved surface 78 facing in the mating direction 14.

In the shown embodiment of FIG. 1, the electrical connector 1 may comprise at least two contact pins 70a, 70b, wherein at least one contact pin 70a is connected to a neutral wire 80 (see FIG. 4) of the electrical connector 1 and at least one other contact pin 70b is connected to a ground wire 82 (see FIG. 4) of the electrical connector 1, thus serving as a neutral contact 84 and a ground contact 86 for the electrical connector 1, respectively.

Additionally or alternatively, the electrical connector 1 may comprise at least one contact pad 92, which has an electrically conductive, round end face 94 facing in the mating direction 14. The embodiment shown in FIG. 2 comprises two such contact pads 92a, 92b, wherein at least one contact pad 92a is connected to a neutral wire of the electrical connector 1 and at least one other contact pad 92b is connected to a ground wire of the electrical connector 1.

Figure 5:
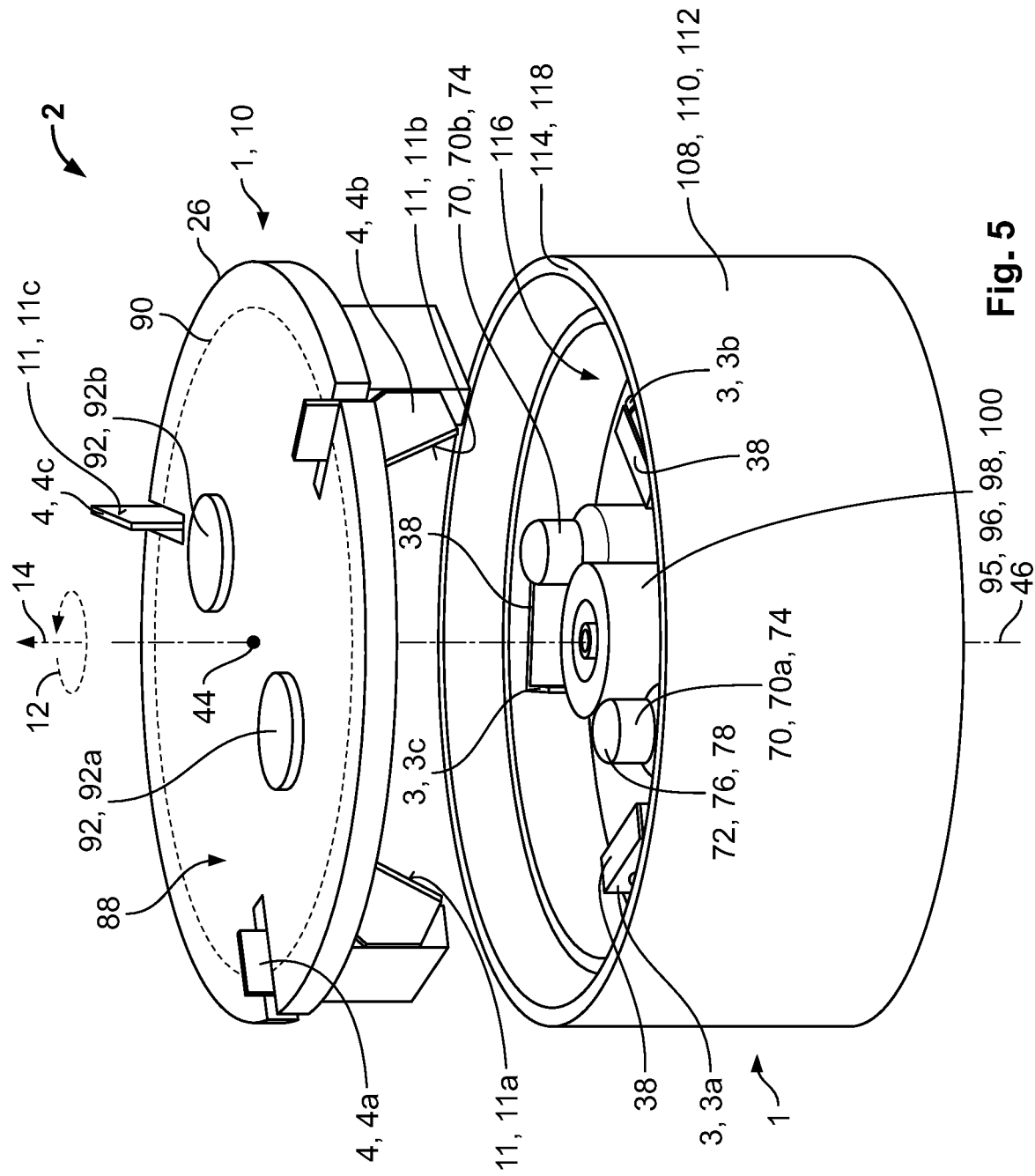
FIG. 5 is a perspective view of a connector assembly according to an embodiment.

Each contact pin 70a, 70b may mirror in terms of position and size a corresponding contact pad 92a, 92b of the mating connector 10, as shown in FIG. 5. As can also be seen in FIG. 5, the contact pins 70 and/or the contact pads 92 may be are arranged within a circular space 88 between the center 44 of the base plate 26 and a connecting circumference 90 of the contact elements 3a, 3b, 3c and/or the corresponding contact elements 4a, 4b, 4c.

Figure 3:
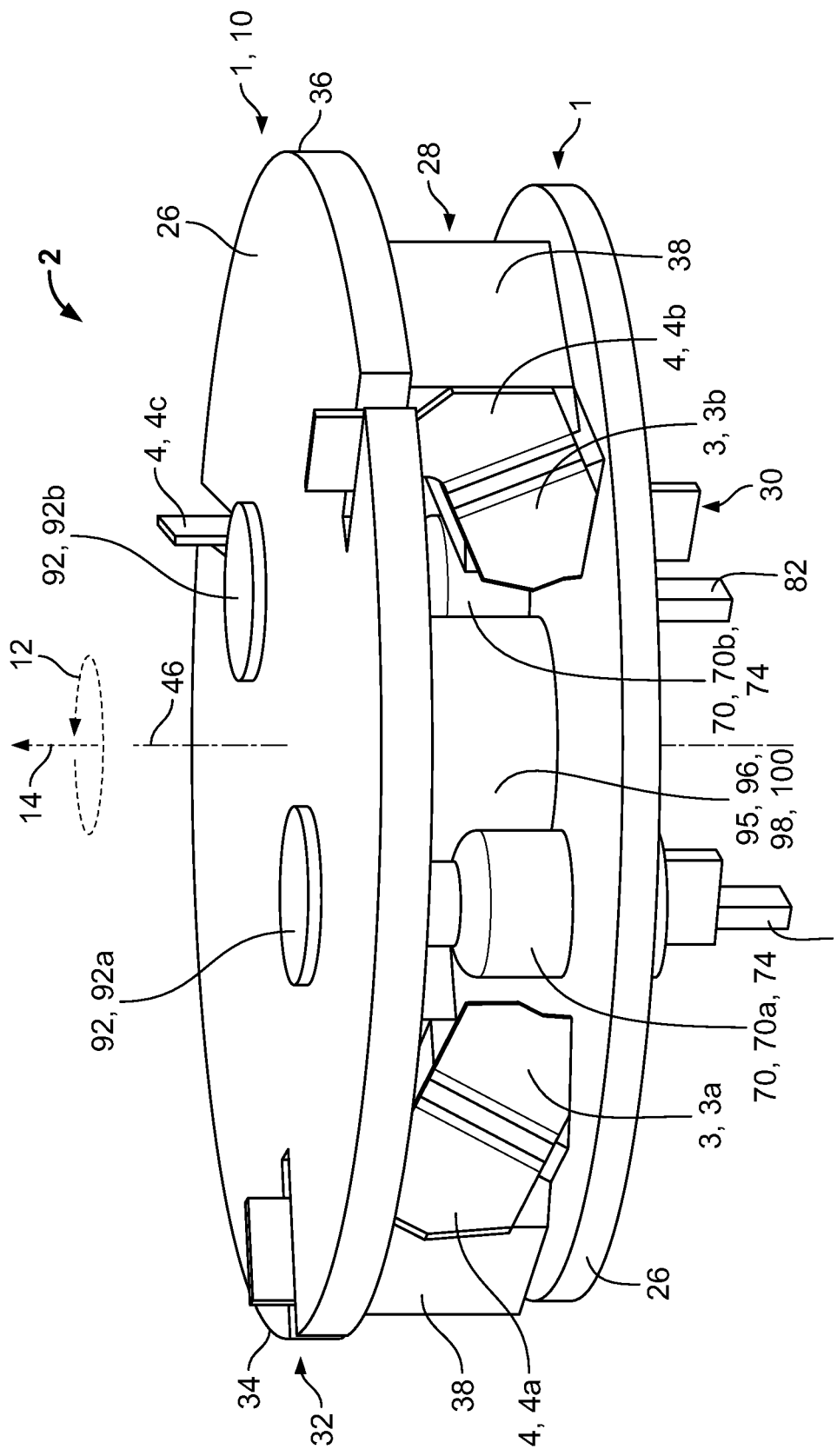
FIG. 3 is a perspective view of the electrical connector of FIG. 1 mated with a mating connector.
Figure 4:
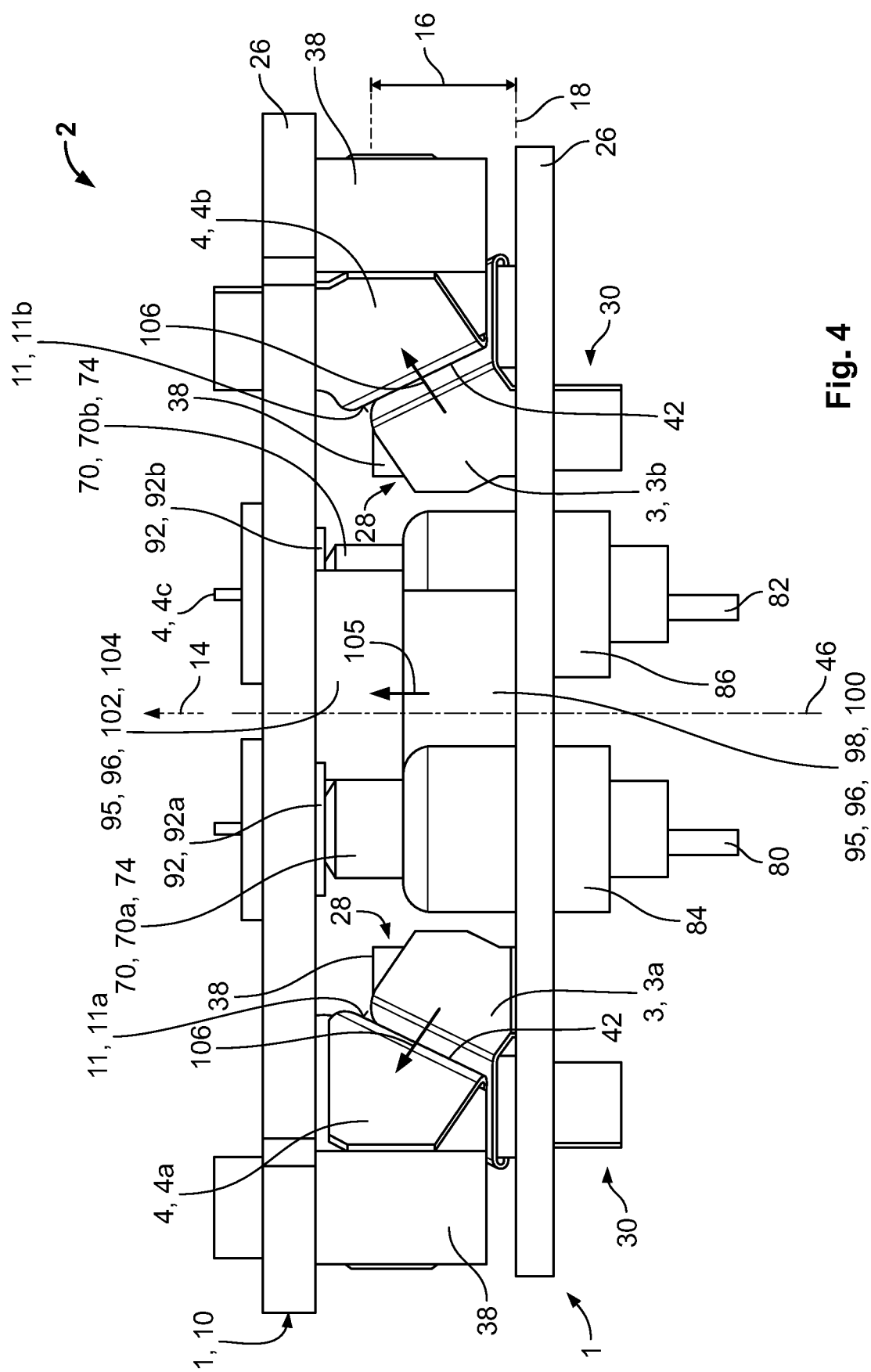
FIG. 4 is a side view of the electrical connector of FIG. 1 mated with the mating connector.

As shown in FIG. 1, the electrical connector 1 may comprise a part of a coupling 95, such as an effective part 98 of a magnetic coupling 96, e.g. an electromagnet 100, in an embodiment attached concentrically to the center 44 of the base plate 26, for attracting the mating connector 10, as is shown in FIGS. 3 and 4. In this case, the mating connector 10 may be constituted by an electrical connector 1 according to the embodiment shown in FIG. 2. The mating connector 10 may have a passive part 102 of the magnetic coupling 96, such as a mating ferromagnetic element 104. Thereby, a magnetic force 105 of the magnetic coupling 96 shown in FIG. 4 may be utilized for creating a contacting force 106 between the contact elements 3a, 3b, 3c of the electrical connector 1 and the corresponding contact elements 4a, 4b, 4c of the mating connector 10.

Additionally or alternatively, the electrical connector 1 may comprise a mechanical locking device of a mechanical coupling, while the mating connector 10 may comprise a complementary locking device of the mechanical coupling.

In FIGS. 3 and 4, the connector assembly 2 is shown, comprising an electrical connector 1 according to the embodiment of FIG. 1 and a mating connector 10 according to the embodiment of FIG. 2. The contact surfaces 5a, 5b, 5c of the electrical connector 1 face outwards with respect to the center axis 46, while the corresponding contact surfaces 11, 11a, 11b, 11c of the mating connector 10 face inwards with respect to the center axis 46. Consequently, all contact points between the contact surfaces 5a, 5b, 5c of the electrical connector 1 and the corresponding contact surfaces 11a, 11b, 11c of the mating connector 10 are arranged on opposite surfaces 48, 50 of the same polyhedron, such as a truncated triangular pyramid 52 (see FIGS. 1 and 2).

The inclination of the contact surfaces 5a, 5b, 5c may prevent a sliding of the contact surfaces 5a, 5b, 5c on the corresponding contact surfaces 11a, 11b, 11c of the mating connector 10. In other words, the contact surfaces 5a, 5b, 5c of the electrical connector 1 may be electrically contacted with the corresponding contact surfaces 11a, 11b, 11c of the mating connector 10 purely by abutment. Thus, the amount of wear occurring during the mating process is reduced and the necessary mating force is lowered.

In an embodiment, only one of the connectors 1, 10 in the connector assembly 2 has convex protrusions 9 on the respective contact surfaces 5, while the other has flat, even and/or plain contact surfaces 5. Thus, the points of electrical contacting are precisely defined.

In an embodiment, one of the connectors 1, 10 is a ground-side connector of a conductive charging system and the other connector 10, 1 is a vehicle-side connector of a conductive charging system. In this embodiment, the present invention may be utilized in a conductive charging system of an electric vehicle battery, a traction battery or the like.

FIG. 5 shows another possible embodiment of the connector assembly 2, wherein the electric connector 1 further comprises a connector housing 108. The connector housing 108 is made of an electrically insulating material, such as a resin. The connector housing 108 at least partially surrounds the three contact elements 3a, 3b, 3c of the electrical connector 1. In particular, the connector housing 108 may be a connector casing 110 or connector shell 112, fixedly attached to the base plate 26. In the shown embodiment of FIG. 5, a housing wall 114 of the connector housing 108 extends along an outer circumference 116 of the base plate 26 and protrudes along the mating direction 14 in the shape of a hollow cylinder 118. Thus, the connector housing 108 may protect the electrical connector 1 from external, chemical, mechanical or other harmful influences, such as water, dirt or dust.

Alternatively, the connector housing 108 may be spring-loaded and movably attached to the base plate 26. In FIG. 6, a possible embodiment of the electrical connector 1 is shown with such a spring-loaded connector housing 120. As can be seen, the connector housing 108 is attached via springs 122 to the base plate 26. Thereby, the spring-loaded connector housing 120 may be moved from a position 124, in which it protects the three contact elements 3a, 3b, 3c during an unmated state, to a position 126 in which it uncovers the three contact elements 3a, 3b, 3c during a mated state (shown as a dotted line). In sum, the connector housing 108, 120 may be retracted against the mating direction 14 prior to or during the mating process.

As can further be seen in FIG. 6, the housing wall 114 may have a chamfered outer edge 128 tapering in the mating direction 14. The mating connector 10 may comprise a mating housing with a receptacle opening having a chamfered inner edge configured to function as a centering aid jointly with the chamfered outer edge 128 during the mating process.

According to one possible embodiment, the shape of the housing wall 114 and the receptacle opening may comprise a behavior-shaping feature for preventing a mating of the electrical connector 1 with the mating connector 10 in a false position. More precisely, the housing wall 114 and the receptacle opening may form a key-lock-pair, which can be inserted into each other in a pre-defined discrete position only. This embodiment is especially advantageous in applications where the electrical connector 1 and the mating connector 10 are mated manually.

In another embodiment, a charging robot has a robotic arm, such as a 3-, 4- or 5-axes robotic arm, and an electrical connector 1, 10 according to one of the above embodiments, wherein the electrical connector 1, 10 is a ground-side connector mounted on an end section of the robotic arm and the robotic arm is configured to automatically move and mate the electrical connector 1, 10 with a vehicle-side connector 10, 1. Thus, the mating process may be further facilitated through automation. For this, the charging robot may further comprise sensors, contact-less sensors in an embodiment, such as cameras and/or distance sensors configured to provide a control system of the charging robot with measurement values in order to guide the movement of the robotic arm.

What is claimed is:

1. An electrical connector configured to be mated with a mating connector along a mating direction, comprising:
   a plurality of contact elements each having a contact surface at least partially inclined with respect to the mating direction and positioned in relation to an inclined portion of a socket, the contact elements are spaced apart from each other along a circumferential direction with respect to the mating direction.

2. The electrical connector of claim 1, wherein the contact elements are solitary and a gap is formed between the contact elements.

3. The electrical connector of claim 1, further comprising a base plate, the contact elements extend along the mating direction through the base plate.

4. The electrical connector of claim 3, wherein the socket is located on the base plate, and the contact elements are attached on the socket.

5. The electrical connector of claim 4, wherein each contact element is positioned one of a plurality of sockets of the base plate.

6. The electrical connector of claim 3, wherein the contact surfaces face either outwards or inwards with respect to a center of the base plate.

7. The electrical connector of claim 1, wherein the contact elements have a same height with respect to the mating direction.

8. The electrical connector of claim 1, wherein each contact surface has a convex protrusion.

9. The electrical connector of claim 1, wherein each contact surface has a plurality of convex protrusions.

10. The electrical connector of claim 9, wherein a vertex of each of the plurality of convex protrusions is arranged on a surface of one of a polyhedron and a rotated body.

11. The electrical connector of claim 1, further comprising a pin movable along the mating direction and having an end section facing in the mating direction.

12. The electrical connector of claim 1, further comprising a contact pin movable along the mating direction and having an end section facing in the mating direction.

13. The electrical connector of claim 1, further comprising a contact pad having an end face facing in the mating direction.

14. A connector assembly, comprising:
   an electrical connector including a plurality of first contact elements each having a first contact surface at least partially inclined with respect to a mating direction, the first contact elements are spaced apart from each other along a circumferential direction with respect to the mating direction, the first contact surface of each of the first contact elements faces outwards; and
   a mating connector including a plurality of second contact elements each having a second contact surface at least partially inclined with respect to the mating direction, the second contact elements are spaced apart from each other along the circumferential direction with respect to the mating direction, the second contact surface of each of the second contact elements faces inwards, a plurality of contact points between the first contact surfaces and the second contact surfaces are arranged on a surface of one of a polyhedron and a rotated body.

15. The connector assembly of claim 14, wherein one of the electrical connector and the mating connector is a ground-side connector of a conductive charging system and the other of the electrical connector and the mating connector is a vehicle-side connector of the conductive charging system.

16. A charging robot, comprising:
   an electrical connector mounted on an end section of a robotic arm, the electrical connector including a plurality of contact elements each having a contact surface at least partially inclined with respect to a mating direction, the contact elements are spaced apart from each other along a circumferential direction with respect to the mating direction.

* * * * *